US009247191B2

(12) United States Patent
Saari et al.

(10) Patent No.: US 9,247,191 B2
(45) Date of Patent: Jan. 26, 2016

(54) WIRELESS EXTERNAL MULTI-MICROPHONE SYSTEM FOR MOBILE DEVICE ENVIRONMENT

(75) Inventors: Jarmo I. Saari, Turku (FI); Miikka Tikander, Helsinki (FI); Sampo V. Vesa, Helsinki (FI); Timo J. Toivanen, Mäntsälä (FI)

(73) Assignee: Nokia Technologies Oy, Espoo (FI)

( * ) Notice: Subject to any disclaimer, the term of this patent is extended or adjusted under 35 U.S.C. 154(b) by 85 days.

(21) Appl. No.: 13/595,411

(22) Filed: Aug. 27, 2012

(65) Prior Publication Data

US 2014/0056570 A1 Feb. 27, 2014

(51) Int. Cl.
  *H04N 5/77* (2006.01)
  *H04N 9/806* (2006.01)
  *G11B 27/034* (2006.01)
  *G11B 27/10* (2006.01)
  *H04N 1/00* (2006.01)
  *H04N 1/32* (2006.01)

(52) U.S. Cl.
  CPC .............. *H04N 5/77* (2013.01); *G11B 27/034* (2013.01); *G11B 27/10* (2013.01); *H04N 1/00323* (2013.01); *H04N 1/32128* (2013.01); *H04N 5/772* (2013.01); *H04N 9/8063* (2013.01); *H04N 2201/3215* (2013.01); *H04N 2201/3264* (2013.01)

(58) Field of Classification Search
  CPC ....................................................... H04N 5/765
  USPC .................................................. 386/224, 228
  See application file for complete search history.

(56) References Cited

U.S. PATENT DOCUMENTS

| 6,560,648 | B1 * | 5/2003 | Dunn et al. ................... 709/224 |
| 2006/0104616 | A1 * | 5/2006 | Shellshear ....................... 386/96 |
| 2008/0002948 | A1 | 1/2008 | Murata et al. ................... 386/96 |

(Continued)

FOREIGN PATENT DOCUMENTS

JP 2001-339631 12/2001

OTHER PUBLICATIONS

Wehr, et al., "Synchronization of Acoustic Sensors for Distributed Ad-hoc Audio Networks and Its Use for Blind Source Separation", (Dec. 2004), (8 pages). http://www.youtube.com/watch?v=_ZmxG_2q4A0&feature= related, "Microphones & Audio Syncing Tutorial: Indy News", (Apr. 30, 2012), (3 pages).

(Continued)

*Primary Examiner* — Hung Dang
*Assistant Examiner* — Girumsew Wendmagegn
(74) *Attorney, Agent, or Firm* — Harrington & Smith (57) ABSTRACT

A method to merge data recorded using a wireless external multi-microphone system is described. The method includes determining a communication delay between a mobile device and an accessory device. In response to activation of a camera application, an activation indication is sent to the accessory device and, in response, the accessory device starts recording audio. In response to a camera event, a camera event indication is sent to the accessory device. The camera event includes starting a video recording, pausing/resuming a video recording, ending a video recording or taking a photograph. In response to receiving the camera event indication, the accessory device creates a marker corresponding to the reception time. The method also includes receiving, at the mobile device, the audio data and the marker; and merging image data and the audio based on the marker and the communication delay. Apparatus and computer readable media are also described.

19 Claims, 5 Drawing Sheets

(56) References Cited

U.S. PATENT DOCUMENTS

2008/0225651 A1  9/2008  Waites .............................. 369/4
2013/0121662 A1*  5/2013  Moorer ......................... 386/240
2014/0049636 A1*  2/2014  O'Donnell et al. ........... 348/143

OTHER PUBLICATIONS http://www.youtube.com/watch?v=HBE8WQiRqDw, "Syncing Audio From a Microphone With Your Camera", (Aug. 4, 2011), (2 pages).

* cited by examiner

WIRELESS EXTERNAL MULTI-MICROPHONE SYSTEM FOR MOBILE DEVICE ENVIRONMENT

TECHNICAL FIELD

The exemplary and non-limiting embodiments relate generally to wireless communication systems, methods, devices and computer programs and, more specifically, relate to wireless external multi-microphone systems for mobile devices.

BACKGROUND

This section is intended to provide a background or context. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Usage of mobile phone cameras has become very popular. People use the cameras to take still images and short videos. Many mobile phone cameras offer several picture and audio related enhancements and configurations to personalize pictures for immediate sharing through social media. To serve this camera usage, features are provided for modifying still images and video. These features allow showing motion in still pictures (such as a cinemagraph for example), intelligent focus/depth, and providing time/location details.

SUMMARY

The below summary section is intended to be merely exemplary and non-limiting.

The foregoing and other problems are overcome, and other advantages are realized, by the use of the exemplary embodiments.

In a first aspect thereof an exemplary embodiment provides a method to merge data recorded using a wireless external multi-microphone system. The method includes determining a communication delay between a mobile device and an accessory device. The method includes, in response to activation of a camera application on the mobile device, sending an indication of the activation to the accessory device. In response to a camera event, the method includes sending an indication of the camera event to the accessory device. The camera event includes starting a video recording, pausing a video recording, resuming a paused video recording, ending a video recording or taking a photograph. The method also includes receiving, at the mobile device from the accessory device, audio data and a marker corresponding to a time when the accessory device received the indication of the camera event; and merging image data and the audio data based at least in part on the marker and the communication delay.

In another aspect thereof an exemplary embodiment provides a method to merge data recorded using a wireless external multi-microphone system. The method includes determining a communication delay between a mobile device and an accessory device. In response to receiving, at the accessory device, an indication of an activation of a camera application on the mobile device, the method includes starting recording audio data using a plurality of microphones. The method includes, in response to receiving an indication of a camera event, creating a marker corresponding to a time when the accessory device received the indication of the camera event. A camera event includes one of: starting a video recording, pausing a video recording, resuming a paused video recording, ending a video recording and taking a photograph. The method also includes sending, to the mobile device from the accessory device, the audio data and the marker.

In a further aspect thereof an exemplary embodiment provides an apparatus to merge data recorded using a wireless external multi-microphone system. The apparatus includes at least one processor; and at least one memory storing computer program code. The at least one memory and the computer program code are configured to, with the at least one processor, cause the apparatus to perform actions. The actions include to determine a communication delay between a mobile device and an accessory device. In response to activation of a camera application on the mobile device, the actions include to send an indication of the activation to the accessory device. The actions include, in response to a camera event, to send an indication of the camera event to the accessory device. The camera event includes starting a video recording, pausing a video recording, resuming a paused video recording, ending a video recording and taking a photograph. The actions also include to receive, at the mobile device from the accessory device, audio data and a marker corresponding to a time when the accessory device received the indication of the camera event; and to merge image data and the audio data based at least in part on the marker and the communication delay.

In another aspect thereof an exemplary embodiment provides an apparatus to merge data recorded using a wireless external multi-microphone system. The apparatus includes at least one processor; and at least one memory storing computer program code. The at least one memory and the computer program code are configured to, with the at least one processor, cause the apparatus to perform actions. The actions include to determine a communication delay between a mobile device and an accessory device. In response to receiving, at the accessory device, an indication of an activation of a camera application on the mobile device, the actions include to start recording audio data using a plurality of microphones. The actions include, in response to receiving an indication of a camera event, to create a marker corresponding to a time when the accessory device received the indication of the camera event. A camera event includes one of: starting a video recording, pausing a video recording, resuming a paused video recording, ending a video recording and taking a photograph. The actions also include to send, to the mobile device from the accessory device, the audio data and the marker.

In a further aspect thereof an exemplary embodiment a computer readable medium to merge data recorded using a wireless external multi-microphone system. The computer readable medium is tangibly encoded with a computer program executable by a processor to perform actions. The actions include determining a communication delay between a mobile device and an accessory device. In response to activation of a camera application on the mobile device, the actions include sending an indication of the activation to the accessory device. The actions include, in response to a camera event, sending an indication of the camera event to the accessory device. The camera event includes starting a video recording, pausing a video recording, resuming a paused video recording, ending a video recording and taking a photograph. The actions also include receiving, at the mobile device from the accessory device, audio data and a marker corresponding to a time when the accessory device received the indication of the camera event; and merging image data and the audio data based at least in part on the marker and the communication delay.

In another aspect thereof an exemplary embodiment provides a computer readable medium to merge data recorded using a wireless external multi-microphone system. The computer readable medium is tangibly encoded with a computer program executable by a processor to perform actions. The actions include determining a communication delay between a mobile device and an accessory device. In response to receiving, at the accessory device, an indication of an activation of a camera application on the mobile device, the actions include starting recording audio data using a plurality of microphones. The actions include, in response to receiving an indication of a camera event, creating a marker corresponding to a time when the accessory device received the indication of the camera event. A camera event includes one of: starting a video recording, pausing a video recording, resuming a paused video recording, ending a video recording and taking a photograph. The actions also include sending, to the mobile device from the accessory device, the audio data and the marker.

In a further aspect thereof an exemplary embodiment an apparatus to merge data recorded using a wireless external multi-microphone system. The apparatus includes means for determining a communication delay between a mobile device and an accessory device. The apparatus include means for sending an indication of the activation to the accessory device in response to activation of a camera application on the mobile device and means for sending an indication of the camera event to the accessory device in response to a camera event. The camera event includes starting a video recording, pausing a video recording, resuming a paused video recording, ending a video recording and taking a photograph. The apparatus also include means for receiving, at the mobile device from the accessory device, audio data and a marker corresponding to a time when the accessory device received the indication of the camera event and means for merging image data and the audio data based at least in part on the marker and the communication delay.

In another aspect thereof an exemplary embodiment provides an apparatus to merge data recorded using a wireless external multi-microphone system. The apparatus includes means for determining a communication delay between a mobile device and an accessory device. The apparatus includes means for starting recording audio data using a plurality of microphones in response to receiving, at the accessory device, an indication of an activation of a camera application on the mobile device and means for creating a marker corresponding to a time when the accessory device received the indication of the camera event in response to receiving an indication of a camera event. A camera event includes one of: starting a video recording, pausing a video recording, resuming a paused video recording, ending a video recording and taking a photograph. The apparatus also includes means for sending, to the mobile device from the accessory device, the audio data and the marker.

BRIEF DESCRIPTION OF THE DRAWINGS

The foregoing and other aspects of exemplary embodiments are made more evident in the following Detailed Description, when read in conjunction with the attached Drawing Figures, wherein.

DETAILED DESCRIPTION

The audio recording for a single image or video (which has many images) may be performed using headset microphones. These microphones can be located in an accessory device close to the user's ear and hence would record sounds like those that were actually heard. However, using an external multi-microphone system introduces delays between the devices which can negatively impact the synchronization of captured audio and video. These delays may be caused by the time a signal uses to travel between the devices and the time the devices take to process any received messages. Various exemplary embodiments provide techniques to ensure the audio recorded using an external multi-microphone system properly synchronizes with the video recording.

Figure 1:
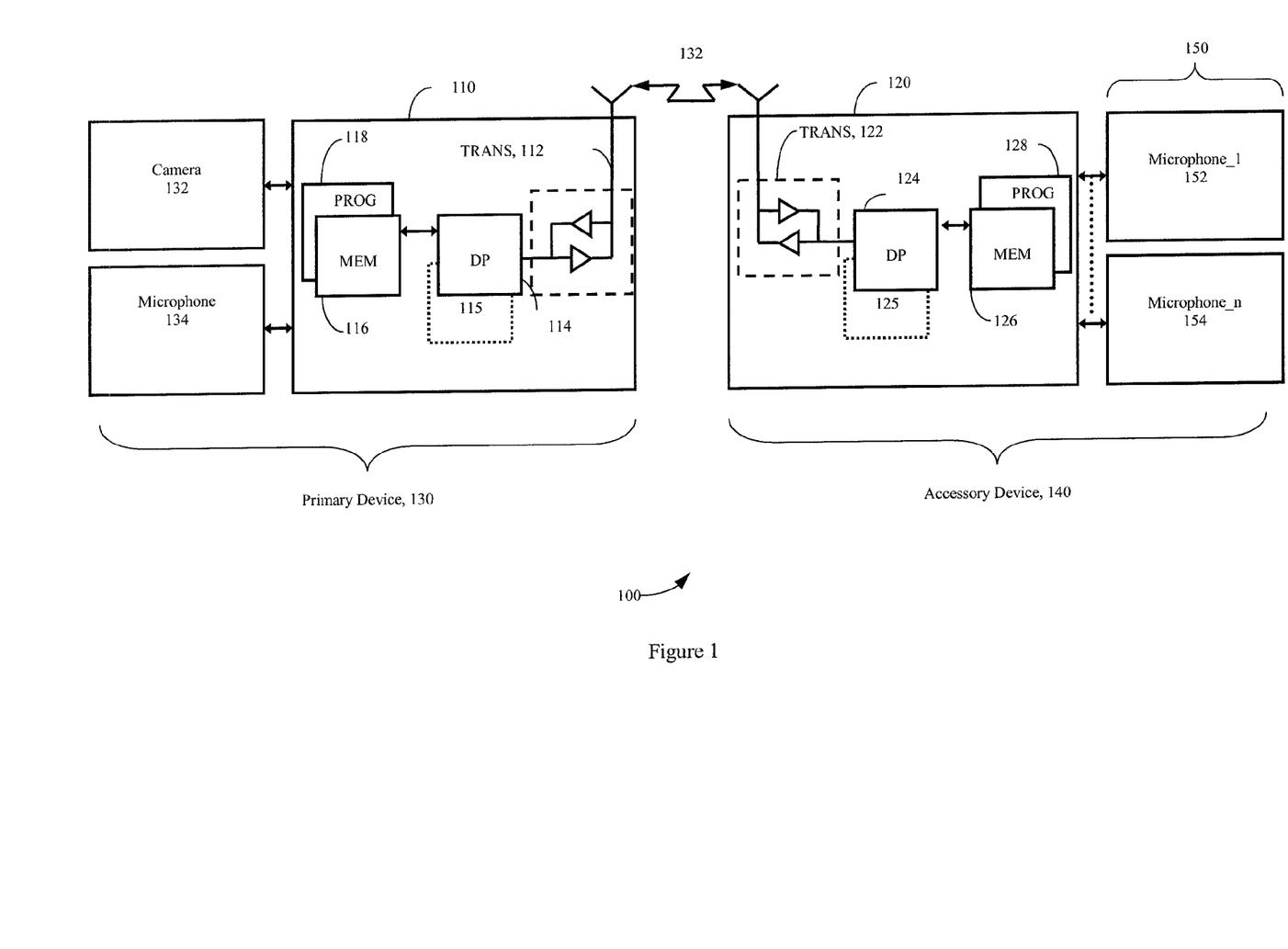
FIG. 1 shows a simplified block diagram of exemplary electronic devices that are suitable for use in practicing various exemplary embodiments.

Reference is made to FIG. 1 for illustrating a simplified block diagram of various electronic devices and apparatus that are suitable for use in practicing various exemplary embodiments.

In the audio/image recording system 100 of FIG. 1, a primary device 130 (such as a mobile phone for example) is adapted for communication over a wireless link 132 with an accessory device 140. The primary device 130 includes a processor portion 110 having a controller, such as a computer or a data processor (DP) 114, a computer-readable memory medium embodied as a memory (MEM) 116 that stores a program of computer instructions (PROG) 118, and a suitable wireless interface, such as radio frequency (RF) transceiver 112, for bidirectional wireless communications with the accessory device 140 via one or more antennas. Additionally, primary device 130 includes a camera 132 and a microphone 134. The camera 132 and/or microphone 134 may be hard-wired to the processor portion 110 or attached to the processor portion 110 via suitable interface.

The accessory device 140 also includes a processor portion 120 having a controller, such as a computer or a data processor (DP) 124, a computer-readable memory medium embodied as a memory (MEM) 126 that stores a program of computer instructions (PROG) 128, and a suitable wireless interface, such as RF transceiver 122, for communication with the primary device 130 via one or more antennas. Additionally, accessory device 140 includes a plurality of microphones 150, such as microphone_1 152 through microphone_n 154.

At least one of the PROGs 118 and 128 is assumed to include program instructions that, when executed by the associated DP, enable the device to operate in accordance with exemplary embodiments, as will be discussed below in greater detail.

That is, various exemplary embodiments may be implemented at least in part by computer software executable by the DP 114 of the primary device 130 and/or by the DP 124 of the accessory device 140, or by hardware, or by a combination of software and hardware (and firmware).

The primary device 130 and the accessory device 140 may also include dedicated processors, for example multi-point control unit (MCU) 115 and MCU 125. The MCU 115 and MCU 125 may be used to handle communications between the primary device 130 and the accessory device 140, such as using Bluetooth or Wi-Fi connection for example.

In general, the various embodiments of the primary device 130 can include, but are not limited to, image capture devices having image capture capabilities, cellular telephones having image capture capabilities, tablets having image capture capabilities, personal digital assistants (PDAs) having image capture capabilities, portable computers having image capture capabilities, gaming devices having image capture capabilities, music storage and playback appliances having image capture capabilities, Internet appliances having image capture capabilities, as well as portable units or terminals that incorporate combinations of such functions.

In general, the various embodiments of the accessory device 140 can include, but are not limited to, a headset audio recording device, a handheld microphone array, etc.

The computer readable MEMs 116 and 126 may be of any type suitable to the local technical environment and may be implemented using any suitable data storage technology, such as semiconductor based memory devices, flash memory, magnetic memory devices and systems, optical memory devices and systems, fixed memory and removable memory. The DPs 114 and 124 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 112 and 122) may be of any type suitable to the local technical environment and may be implemented using any suitable communication technology such as individual transmitters, receivers, transceivers or a combination of such components.

Figure 2:
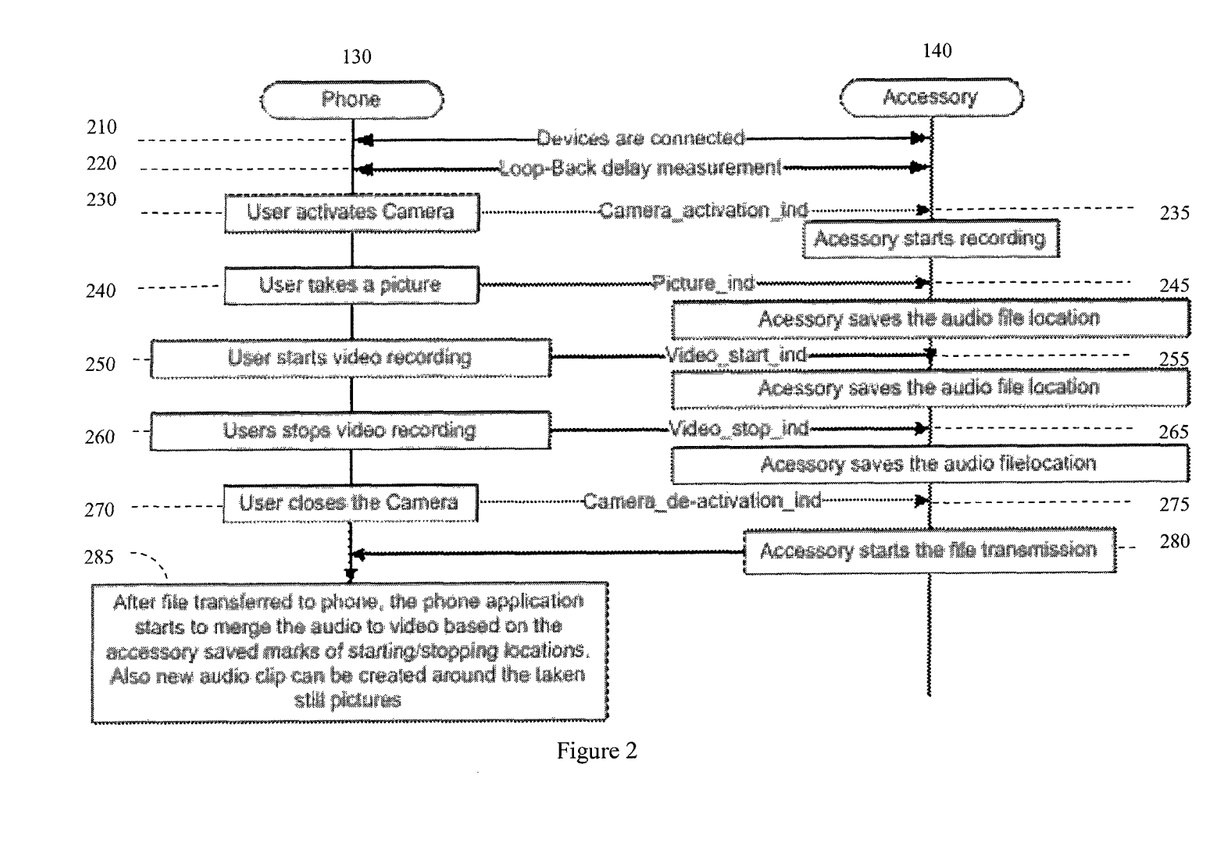
FIG. 2 illustrates a simplified signaling diagram of the exemplary electronic devices practicing a first exemplary embodiment.

FIG. 2 illustrates a simplified signaling diagram of exemplary electronic devices that are practicing a first exemplary embodiment. As shown, the primary device 130 is a mobile phone communicating with the accessory device 140. At point 210, the devices 130, 140 are connected (such as by an automatic pairing when the accessory device 140 is turned on for example). In response to connecting the phone 130 and accessory 140, a loop-back delay measurement is performed automatically in order to determine a delay between when the phone 130 transmits a message and when the accessory 140 receives and processes the message at point 220.

In a non-limiting example, the loop-back delay measurement may include sending a first message/indication from the primary device 130 to the accessory 140. The accessory 140 immediately sends a message/indication back to the primary device 130. The delay is then calculated as half the time taken for both messages/indications (this assumes the delay is the same for both directions. The loop-back delay measurement may also include several communications (such as additional ping-pong exchanges for example) and may be performed a number of times in order to calculate an average delay. Once calculated the delay may be saved in a memory file (such as one stored in MEM 116 in the phone 130 and/or MEM 126 in the accessory 140).

At point 230, the user activates the camera application of the phone 130 and an indication of this event (Camera_activation_ind) is provided to the accessory 140. At point 235, the accessory 140 receives the indication that the camera application is activated and begins recording audio data.

Data received from microphones 150 are combined into one audio file (such as by DP 124 for example). The audio file is then saved to a file system. As a non-limiting example, the file system is stored in MEM 126.

Later, at point 240, the user takes a picture using camera 132 and the phone 130 sends an indication of the picture taking event (Picture_ind) to the accessory 140. The indication is received at point 245 and accessory 140 saves a marker of the audio file location corresponding to point 245 (such as a timestamp, a byte count, or other indication of the time elapsed from the start of the audio recording/point 235 for example).

At another point 250, the user starts a video recording. The phone 130 sends an indication of the event (Video_start_ind) to the accessory 140 which is received at point 255. The accessory 140 saves a marker of the audio file location corresponding to point 245. Then at point 260, the user stops the video recording and an indication of the event (Video_stop_ind) is sent to the accessory 140. When the accessory 140 receives this indication (at point 255), a marker of the audio file location is saved.

Next the user stops the video recording at point 260. As before, the phone 130 sends an indication of the event (Video_stop_ind) to the accessory 140 which is received at point 265. In response, the accessory 140 saves a marker of the audio file location corresponding to point 265.

Eventually, the user closes/de-activates the camera application at point 270 and the phone 130 provides an indication of the activity (Camera_de-activation_ind) to the accessory 140 which is received at point 275. In response to receiving this indication, the accessory 140 stops recording audio and begins a file transfer in order to transmit the recorded audio and any saved markers to the phone 130 at point 280.

Once the phone 130 receives the file transfer (such as by using an object exchange (OBEX) application, using Bluetooth protocols, etc. for example), the phone 130 may post-process the audio recording in order to merge the audio with the image/photo data. This processing uses the saved markers and the calculated delay in order to identify the portions of the audio recording with properly synch with the data recorded by the phone 130 during the associated time frame.

Figure 3:
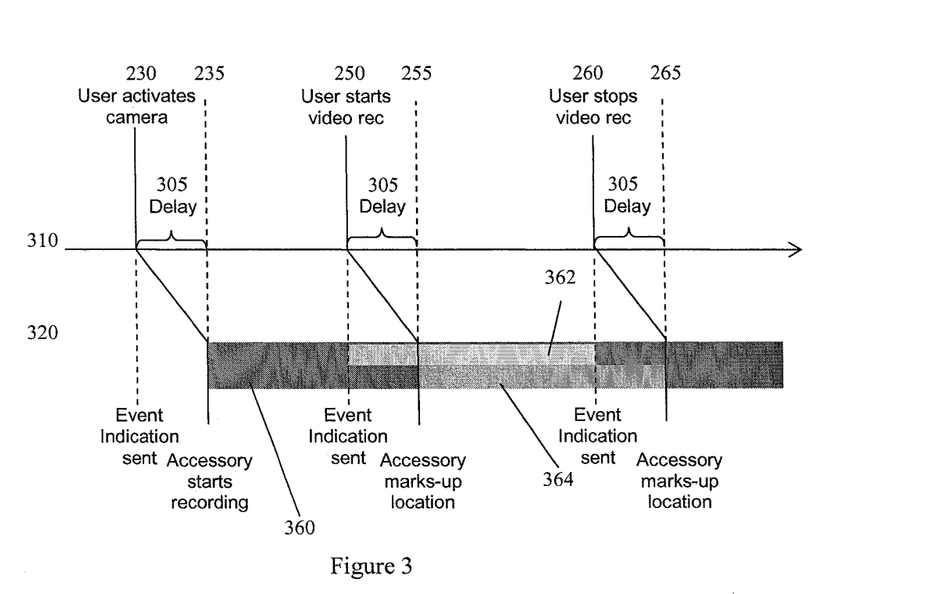
FIG. 3 displays a timeline of a video recording in accordance with the first exemplary embodiment.

FIG. 3 displays a timeline of a video recording in accordance with the first exemplary embodiment. Line 310 represents events occurring at the phone 130 and line 320 represents events occurring at the accessory 140. As shown in FIG. 2, at point 230, the user activates the camera 132 and an event indication is sent from the phone 130 to the accessory 140. The time between when the indication is sent (point 230) and when the indication is received at the accessory 140 (point 235) is shown as delay 305.

Block 360 indicates the audio recorded by the accessory 140. The audio 360 represents the combination of audio tracks recorded from the plurality of microphones 150. Sub-block 362 coincides with the time when the phone 130 is recording video (from point 250 to point 260). However, due to the delay 305, block 364 is the block of audio indicated by the marked-up locations (matching points 255 and 265).

Blocks 362 and 364 are shown as covering only a portion of the audio 360 during the relevant time frame for illustration purposes. Accordingly, the audio data for either block 362 and 364 may include the combination of all audio tracks recorded from the plurality of microphones 150.

Merging the video recording with the block of audio 364 corresponding to the marked-up locations would produce an out-of-synch recording where the audio track does not match with the video. However, when merging the video recording with the audio data 360, the post-processing (at point 285 in FIG. 2) adjusts the marked-up locations based on the delay 305 which was determined at point 220 in FIG. 2. This enables the video recording to use the block of audio 362 which more closely synchronizes with the video.

Based on the foregoing it should be apparent that various exemplary embodiments provide a method, apparatus and computer program(s) to operate wireless external multi-microphone systems for mobile devices.

Figure 5:
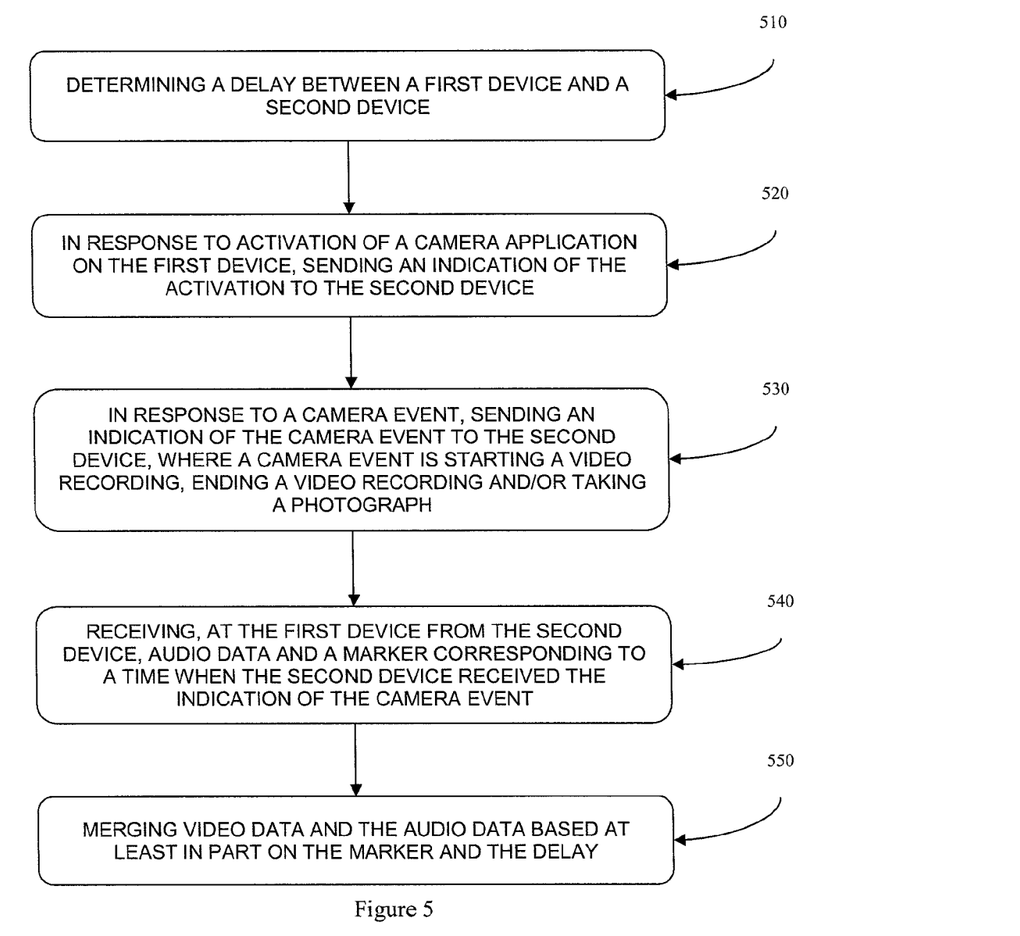
FIG. 5 is a logic flow diagram that illustrates the operation of an exemplary method, and a result of execution of computer program instructions embodied on a computer readable memory, in accordance with various exemplary embodiments.

FIG. 5 is a logic flow diagram that illustrates the operation of an exemplary method (such as performed by primary device 130 for example), and a result of execution of computer program instructions (such as PROG 118 for example) embodied on a computer readable memory (such as MEM 116 for example), in accordance with the first exemplary embodiment. In accordance with these exemplary embodiments a method performs, at Block 510, a step of determining a delay between a first device (such as the primary device 130 for example) and a second device (such as accessory device 140 for example). In response to activation of a camera application on the first device, the method performs, at Block 520, a step of sending an indication of the activation to the second device. In response to a camera event, the method performs a step of sending an indication of the camera event to the second device at Block 530. A camera event is starting a video recording, ending a video recording and/or taking a photograph. At Block 540, the method performs a step of receiving, at the first device from the second device, audio data and a marker corresponding to a time when the second device received the indication of the camera event. The method also performs, at Block 550, a step of merging video data and the audio data based at least in part on the marker and the delay.

Figure 6:
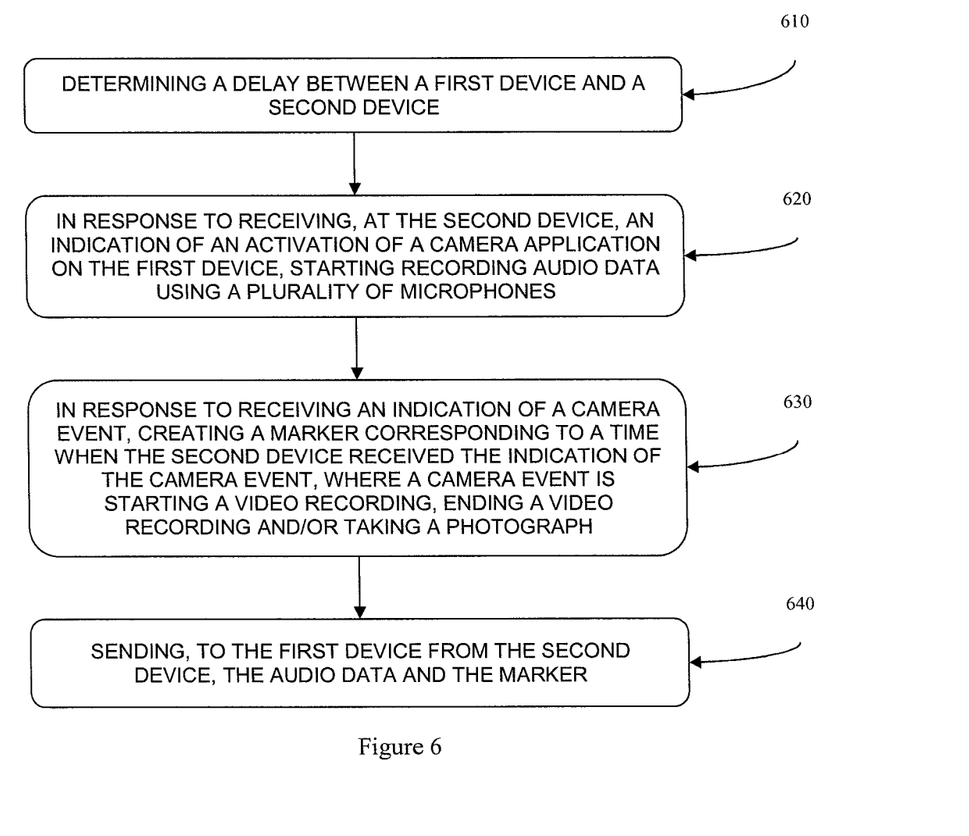
FIG. 6 is a logic flow diagram that illustrates the operation of an exemplary method, and a result of execution of computer program instructions embodied on a computer readable memory, in accordance with various exemplary embodiments.

FIG. 6 is a logic flow diagram that illustrates the operation of an exemplary method (such as performed by accessory device 140 for example), and a result of execution of computer program instructions (such as PROG 128 for example) embodied on a computer readable memory (such as MEM 126 for example), in accordance with the second exemplary embodiment. In accordance with these exemplary embodiments a method performs, at Block 610, a step of determining a delay between a first device (such as primary device 130 for example) and a second device (such as accessory device 140 for example). In response to receiving, at the second device, an indication of an activation of a camera application on the first device, the method performs a step of starting recording audio data using a plurality of microphones at Block 620. In response to receiving an indication of a camera event, the method performs, at Block 630, a step creating a marker corresponding to a time when the second device received the indication of the camera event. A camera event is starting a video recording, ending a video recording and/or taking a photograph. The method also performs, at Block 640 a step sending, to the first device from the second device, the audio data and the marker.

The various blocks shown in FIGS. 5 and 6 may be viewed as method steps, and/or as operations that result from operation of computer program code, and/or as a plurality of coupled logic circuit elements constructed to carry out the associated function(s).

The accessory 140 can provide the audio data using real-time streaming and/or a post-processing based implementation. In real-time streaming, a continuous audio connection is maintained with the mobile device. This continuous audio connection may be sensitive to separate radio link disturbances and place high performance demands on the mobile device.

In contrast, the post-processing based technique records the audio data (for video and still pictures) at the accessory device 140. This audio data is then merged with the video data and processed in order to ensure the synchronization of the video and audio portions.

In both techniques, the accessory device 140 continuously records audio while the camera application is active. The accessory device 140 tracks the locations of the audio file for various camera events (such as the start/stop/pause of video, the taking of a still picture, etc. for example) by recording markers. Based on these location markers, the phone 130 can merge the audio with the video or create an audio clip to merge with a still picture.

These audio file location markers can be time based or a pointer to an audio file location. For example, in a first, non-limiting embodiment a marker may be a timestamp indicating when the accessory 140 received notification of the associated camera event. In another, non-limiting embodiment the audio data may include flags indicating when during the audio recording the accessory 140 received notification of the associated camera event. The marker may include an indication of the associated camera event (such as whether the camera event was a start of video recording or the taking of a still picture for example).

In the alternative, the marker may omit such camera event information. In such case, the primary device 130 may determine which marker is associated with which camera event, for example, based on the order in which the markers occur.

As described in FIG. 2, the accessory device 140 stores the audio data until receiving an indication that the camera application has been deactivated. However, other audio transfer options are within the scope of the various embodiments. In a first alternative embodiment, the accessory device 140 may stream the audio data and markers to the primary device 130 as the audio is received from the plurality of microphones 150. In another alternative embodiment, once a threshold amount of audio data is recorded, the accessory device 140 begins the transfer. These alternative embodiments reduce the amount of time taken after the camera application has been deactivated before the audio data is fully transferred. This in turn reduces the amount of time before the merged video/audio data is available for review by the user.

The phone 130 may save a timestamp of the activation starting point (such as to a 'RecLog' file for example). The RecLog file may also include information about the recording locations in the recorded audio file corresponding to the video capture starting/stopping points and the time when still pictures are taken. The RecLog file may be located in the phone 130 or in the accessory 140. When the phone 130 is managing the file, the file transfer between the devices may be reduced as the transfer of the RecLog file to phone 130 may be omitted. Once the video capture is completed and the audio file is transferred to the phone 130, a post-processing application can merge the audio to the video.

During post-processing, the synchronization may also use cross-correlation between the multiple audio tracks. For example, a first audio track in the audio data may be cross-correlated to a second audio track. Additionally, the primary device 130 may record audio data via microphone 134 which may be used to cross-correlate the audio data provided by the accessory device 140 (and/or merged with the video recording).

Still image audio features may further enhance intelligent still images. Advanced audio processing includes spatial and surround effect through the use of advance recording techniques such as bin aural recording, rich recording, surround sound recording, etc. for example. Additional exemplary embodiments make it possible to record audio for a still picture and even use audio recorded before the picture is taken.

In a further exemplary embodiment, the primary device 130 may be connected to a plurality of accessory devices 140. Accordingly, the primary device 130 may determine the separate delays between the primary device 130 and each accessory device 140. The primary device 130 may broadcast the various camera event indications to all accessory devices 140 simultaneously.

The various audio tracks may be sampled at the same rate or at different rates. For example, audio data recorded using microphone 134 may have a different sampling rate than audio data recorded using microphones 150. When merging the audio data, the primary device 130 may resample (or otherwise adjust) the audio data from the various audio tracks.

In another exemplary embodiment, when the accessory device 140 begins transmission of the audio data prior to deactivation of the camera application (using real-time streaming, transmitting after a threshold amount of audio data is recorded, etc.), the primary device 130 may begin processing of recorded video and audio data prior to the deactivation of the camera application. For example, if sufficient audio/video data is available to merge audio and video for a still image the merging may be processed while the camera application is still active. Audio and video data for a video recording may be processed likewise.

Figure 4:
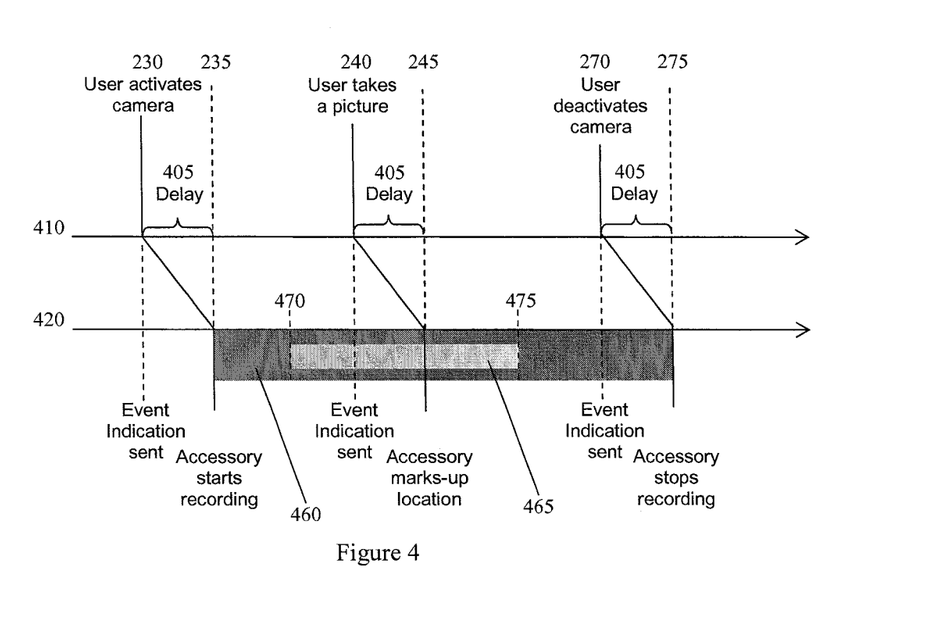
FIG. 4 displays a timeline of a photograph with audio being taken in accordance with a second exemplary embodiment.

FIG. 4 displays a timeline of a photograph with audio being taken in accordance with a second exemplary embodiment. Line 410 represents events occurring at the phone 130 and line 320 represents events occurring at the accessory 140. As shown in FIG. 2, at point 230, the user activates the camera 132 and an event indication is sent from the phone 130 to the accessory 140. The time between when the indication is sent (point 230) and when the indication is received at the accessory 140 (point 235) is shown as delay 405.

Block 460 indicates the block of time when the accessory 140 is recording audio data. This block spans the time from point 235 when the accessory 140 receives the indication that the camera 132 has been activated to point 265 when the accessory 140 receives the indication that the camera 132 has been de-activated.

Block 465 is shown as covering only a portion of the audio 460 during the relevant time frame for illustration purposes. Accordingly, the audio data for block 465 may includes the combination of all audio tracks recorded from the plurality of microphones 150 during that time frame.

When merging the picture with the audio data, the post-processing (at point 285 in FIG. 2) adjusts the marked-up location referring to point 245 based on the delay 405 which was determined at point 220 in FIG. 2. The adjusted location refers to point 240. The post-processing then uses a block of audio 265 which precedes the adjusted location 240 by a first pre-configured amount (to start at point 470) and that continues past the adjusted location 240 by a second pre-configured amount (to end at point 475). Merging the picture with audio block 465 provides a photograph with audio data from the time the photograph was taken.

Note that the post-processing may determine block 465 using other non-limiting methods. For example, the post-processing may use the marked-up location referring to point 245 and directly determine points 470 using the first pre-configured amount and the delay 405.

In an alternative embodiment, the primary device 130 records a short video clip (such as lasting a few seconds for example). The post-processing may be used to identify repetitive motion in the video clip. A cinemagraph may then be created as an image with a minor, repetitive motion. Similarly, the audio data may be used to identify repetitive sounds in the audio data which are then merged with the cinemagraph image.

When creating a cinemagraph, sections for audio looping may be found either manually (where the user decides the looped audio), automatically or a combination of the two (such as the user selected from a set of automatically generated options for example). A user may set the cinemagraph loop section manually for the video using a user interface (UI) (such using a camera/video software interface for example). For automatically finding the audio loop part, a computer analysis may be performed in order to find suitable loop start and end points. This computer analysis may include randomization of different cross-faded sections of the audio data. The looped audio data is not required to be in sync with the video in order to provide ambience to the cinemagraph.

The primary device 130 may also be configured to recalculate the communication delay with the accessory device 140. For example, the primary device 130 may periodically perform a loop-back delay measurement while the accessory device is connected. Alternatively, recalculation the communication delay may be performed in response to various triggering conditions, such as by a user command, detection of motion of the primary device 130, closing of the camera application, etc. for example.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although not limited thereto. While various aspects of the exemplary embodiments may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

It should thus be appreciated that at least some aspects of the exemplary embodiments may be practiced in various components such as integrated circuit chips and modules, and that the exemplary embodiments may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments.

Various modifications and adaptations to the foregoing exemplary embodiments may become apparent to those skilled in the relevant arts in view of the foregoing description, when read in conjunction with the accompanying drawings. However, any and all modifications will still fall within the scope of the non-limiting and exemplary embodiments.

An exemplary embodiment provides a method to merge data recorded using a wireless external multi-microphone system. The method includes determining a communication delay between a first device and a second device. The method includes, in response to activation of a camera application on the first device, sending an indication of the activation to the second device. In response to a camera event, the method includes sending an indication of the camera event to the second device. The camera event includes starting a video recording, pausing a video recording, resuming a paused video recording, ending a video recording and taking a photograph. The method also includes receiving, at the first device from the second device, audio data and a marker corresponding to a time when the second device received the indication of the camera event; and merging video data and the audio data based at least in part on the marker and the communication delay.

In another exemplary embodiment of the method above, the communication delay includes a transmission time delay (such as the time taken to send a message from the first device to the second device for example) and a processing delay (such as the time taken to process the message once received at the second device for example).

In a further exemplary embodiment of any one of the methods above, determining the communication delay includes performing a loop-back procedure.

In another exemplary embodiment of any one of the methods above, receiving the audio data includes receiving a streaming audio file.

In a further exemplary embodiment of any one of the methods above, the method also further includes, in response to de-activation of the camera application, sending an indication of the deactivation to the second device. Receiving the audio data and the marker may be performed in response to sending the indication of the deactivation.

In another exemplary embodiment of any one of the methods above, the audio data includes a plurality of audio data feeds recorded by a plurality of microphones.

In a further exemplary embodiment of any one of the methods above, merging the video data and the audio data includes determining a point in the audio data corresponding to the time the camera event occurred based at least in part on the marker and the communication delay.

In another exemplary embodiment of any one of the methods above, the camera event is a taking of a photograph. Merging the video data and the audio data includes determining a first point in the audio data corresponding to the time the photograph was taken based at least in part on the marker and the communication delay; and merging the photograph with a segment of the audio data which spans a time which precedes the first point in the audio data by a first pre-configured amount of time and which follows the first point in the audio data by a second pre-configured amount.

A further exemplary embodiment provides a method to merge data recorded using a wireless external multi-microphone system. The method includes determining a communication delay between a first device and a second device. In response to receiving, at the second device, an indication of an activation of a camera application on the first device, the method includes starting recording audio data using a plurality of microphones. The method includes, in response to receiving an indication of a camera event, creating a marker corresponding to a time when the second device received the indication of the camera event. A camera event includes one of: starting a video recording, pausing a video recording, resuming a paused video recording, ending a video recording and taking a photograph. The method also includes sending, to the first device from the second device, the audio data and the marker.

In another exemplary embodiment of the method above, determining the communication delay includes performing a loop-back procedure.

In a further exemplary embodiment of any one of the methods above, the method also includes, in response to receiving an indication of a deactivation of a camera application on the first device, sending the audio data and the marker.

Another exemplary embodiment provides an apparatus to merge data recorded using a wireless external multi-microphone system. The apparatus includes at least one processor; and at least one memory storing computer program code. The at least one memory and the computer program code are configured to, with the at least one processor, cause the apparatus to perform actions. The actions include to determine a communication delay between a first device and a second device. In response to activation of a camera application on the first device, the actions include to send an indication of the activation to the second device. The actions include, in response to a camera event, to send an indication of the camera event to the second device. The camera event includes starting a video recording, pausing a video recording, resuming a paused video recording, ending a video recording and taking a photograph. The actions also include to receive, at the first device from the second device, audio data and a marker corresponding to a time when the second device received the indication of the camera event; and to merge video data and the audio data based at least in part on the marker and the communication delay.

In a further exemplary embodiment of the apparatus above, the communication delay includes a transmission time delay and a processing delay.

In another exemplary embodiment of any one of the apparatus above, when determining the communication delay the actions include to perform a loop-back procedure.

In a further exemplary embodiment of any one of the apparatus above, when receiving the audio data the actions include to receive a streaming audio file.

In another exemplary embodiment of any one of the apparatus above, the actions further include, in response to de-activation of the camera application, to send an indication of the deactivation to the second device. Receiving the audio data and the marker may be performed in response to sending the indication of the deactivation.

In a further exemplary embodiment of any one of the apparatus above, the audio data includes a plurality of audio data feeds recorded by a plurality of microphones.

In another exemplary embodiment of any one of the apparatus above, when merging the video data and the audio data the actions include to determine a point in the audio data corresponding to the time the camera event occurred based at least in part on the marker and the communication delay.

In a further exemplary embodiment of any one of the apparatus above, the camera event is a taking of a photograph. When merging the video data and the audio data the actions include to determine a first point in the audio data corresponding to the time the photograph was taken based at least in part on the marker and the communication delay; and to merge the photograph with a segment of the audio data which spans a time which precedes the first point in the audio data by a first pre-configured amount of time and which follows the first point in the audio data by a second pre-configured amount.

In another exemplary embodiment of any one of the apparatus above, the apparatus is embodied in a mobile device.

In a further exemplary embodiment of any one of the apparatus above, the apparatus is embodied in an integrated circuit.

Another exemplary embodiment provides an apparatus to merge data recorded using a wireless external multi-microphone system. The apparatus includes at least one processor; and at least one memory storing computer program code. The at least one memory and the computer program code are configured to, with the at least one processor, cause the apparatus to perform actions. The actions include to determine a communication delay between a first device and a second device. In response to receiving, at the second device, an indication of an activation of a camera application on the first device, the actions include to start recording audio data using a plurality of microphones. The actions include, in response to receiving an indication of a camera event, to create a marker corresponding to a time when the second device received the indication of the camera event. A camera event includes one of: starting a video recording, pausing a video recording, resuming a paused video recording, ending a video recording and taking a photograph. The actions also include to send, to the first device from the second device, the audio data and the marker.

In a further exemplary embodiment of the apparatus above, when determining the communication delay the actions include to perform a loop-back procedure.

In another exemplary embodiment of any one of the apparatus above, the actions further include in response to receiving an indication of a deactivation of a camera application on the first device, to send the audio data and the marker.

In a further exemplary embodiment of any one of the apparatus above, the apparatus is embodied in a mobile device.

In another exemplary embodiment of any one of the apparatus above, the apparatus is embodied in an integrated circuit.

An additional exemplary embodiment provides a computer readable medium to merge data recorded using a wireless external multi-microphone system. The computer readable medium is tangibly encoded with a computer program executable by a processor to perform actions. The actions include determining a communication delay between a first device and a second device. In response to activation of a camera application on the first device, the actions include sending an indication of the activation to the second device. The actions include, in response to a camera event, sending an indication of the camera event to the second device. The camera event includes starting a video recording, pausing a video recording, resuming a paused video recording, ending a video recording and taking a photograph. The actions also include receiving, at the first device from the second device, audio data and a marker corresponding to a time when the second device received the indication of the camera event; and merging video data and the audio data based at least in part on the marker and the communication delay.

In a further exemplary embodiment of the computer readable medium above, the communication delay includes a transmission time delay and a processing delay.

In another exemplary embodiment of any one of the computer readable media above, determining the communication delay includes performing a loop-back procedure.

In a further exemplary embodiment of any one of the computer readable media above, receiving the audio data includes receiving a streaming audio file.

In another exemplary embodiment of any one of the computer readable media above, the actions further include, in response to de-activation of the camera application, sending an indication of the deactivation to the second device. Receiving the audio data and the marker may be performed in response to sending the indication of the deactivation.

In a further exemplary embodiment of any one of the computer readable media above, the audio data includes a plurality of audio data feeds recorded by a plurality of microphones.

In another exemplary embodiment of any one of the computer readable media above, merging the video data and the audio data includes determining a point in the audio data corresponding to the time the camera event occurred based at least in part on the marker and the communication delay.

In a further exemplary embodiment of any one of the computer readable media above, the camera event is a taking of a photograph. Merging the video data and the audio data includes determining a first point in the audio data corresponding to the time the photograph was taken based at least in part on the marker and the communication delay; and merging the photograph with a segment of the audio data which spans a time which precedes the first point in the audio data by a first pre-configured amount of time and which follows the first point in the audio data by a second pre-configured amount.

In another exemplary embodiment of any one of the computer readable media above, the computer readable medium is a non-transitory computer readable medium (e.g., CD-ROM, RAM, flash memory, etc.).

In a further exemplary embodiment of any one of the computer readable media above, the computer readable medium is a storage medium.

Another exemplary embodiment provides a computer readable medium to merge data recorded using a wireless external multi-microphone system. The computer readable medium is tangibly encoded with a computer program executable by a processor to perform actions. The actions include determining a communication delay between a first device and a second device. In response to receiving, at the second device, an indication of an activation of a camera application on the first device, the actions include starting recording audio data using a plurality of microphones. The actions include, in response to receiving an indication of a camera event, creating a marker corresponding to a time when the second device received the indication of the camera event. A camera event includes one of: starting a video recording, pausing a video recording, resuming a paused video recording, ending a video recording and taking a photograph. The actions also include sending, to the first device from the second device, the audio data and the marker.

In a further exemplary embodiment of the computer readable medium above, determining the communication delay includes performing a loop-back procedure.

In another exemplary embodiment of any one of the computer readable media above, the actions also include, in response to receiving an indication of a deactivation of a camera application on the first device, sending the audio data and the marker.

In a further exemplary embodiment of any one of the computer readable media above, the computer readable medium is a non-transitory computer readable medium (e.g., CD-ROM, RAM, flash memory, etc.).

In another exemplary embodiment of any one of the computer readable media above, the computer readable medium is a storage medium.

An additional exemplary embodiment provides an apparatus to merge data recorded using a wireless external multi-microphone system. The apparatus includes means for determining a communication delay between a first device and a second device. The apparatus include means for sending an indication of the activation to the second device in response to activation of a camera application on the first device and means for sending an indication of the camera event to the second device in response to a camera event. The camera event includes starting a video recording, pausing a video recording, resuming a paused video recording, ending a video recording and taking a photograph. The apparatus also include means for receiving, at the first device from the second device, audio data and a marker corresponding to a time when the second device received the indication of the camera event and means for merging video data and the audio data based at least in part on the marker and the communication delay.

In a further exemplary embodiment of the apparatus above, the communication delay includes a transmission time delay and a processing delay.

In another exemplary embodiment of any one of the apparatus above, the determining means includes means for performing a loop-back procedure.

In a further exemplary embodiment of any one of the apparatus above, the receiving means includes means for receiving a streaming audio file.

In another exemplary embodiment of any one of the apparatus above, the apparatus also includes means for sending an indication of the deactivation to the second device in response to de-activation of the camera application. Receiving the audio data and the marker may be performed in response to sending the indication of the deactivation.

In a further exemplary embodiment of any one of the apparatus above, the audio data includes a plurality of audio data feeds recorded by a plurality of microphones.

In another exemplary embodiment of any one of the apparatus above, the merging means includes means for determining a point in the audio data corresponding to the time the camera event occurred based at least in part on the marker and the communication delay.

In a further exemplary embodiment of any one of the apparatus above, the camera event is a taking of a photograph. The merging means includes means for determining a first point in the audio data corresponding to the time the photograph was taken based at least in part on the marker and the communication delay; and means for merging the photograph with a segment of the audio data which spans a time which precedes the first point in the audio data by a first pre-configured amount of time and which follows the first point in the audio data by a second pre-configured amount.

Another exemplary embodiment provides an apparatus to merge data recorded using a wireless external multi-microphone system. The apparatus includes means for determining a communication delay between a first device and a second device. The apparatus includes means for starting recording audio data using a plurality of microphones in response to receiving, at the second device, an indication of an activation of a camera application on the first device and means for creating a marker corresponding to a time when the second device received the indication of the camera event in response to receiving an indication of a camera event. A camera event includes one of: starting a video recording, pausing a video recording, resuming a paused video recording, ending a video recording and taking a photograph. The apparatus also includes means for sending, to the first device from the second device, the audio data and the marker.

In a further exemplary embodiment of any one of the apparatus above, the determining means includes means for performing a loop-back procedure.

In another exemplary embodiment of any one of the apparatus above, the apparatus also includes means for sending the audio data and the marker in response to receiving an indication of a deactivation of a camera application on the first device.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments may be used to advantage without the corresponding use of other features. As such, the foregoing description should be considered as merely illustrative of the principles, teachings and exemplary embodiments, and not in limitation thereof.

What is claimed is:

1. A method comprising:

determining a communication delay between a first device and a second device;

in response to activation of a camera application on the first device, sending an indication of the activation to the second device;

in response to a camera event, sending an indication of the camera event to the second device, where the camera event comprises taking a photograph;

receiving, at the first device from the second device, audio data and a marker corresponding to a time when the second device received the indication of the camera event; and merging image data and the audio data, where merging the image data and the audio data comprises:

determining a first point in the audio data corresponding to the time the photograph was taken based at least in part on the marker and the communication delay and merging the photograph with a segment of the audio data which spans a time which precedes the first point in the audio data by a first pre-configured amount of time and which follows the first point in the audio data by a second pre-configured amount of time while cross-correlating audio data from the first device with the audio data from the second device.

2. The method according to claim 1, where the communication delay comprises a transmission time delay and a processing delay.

3. The method according to claim 1, where determining the communication delay comprises performing a loop-back procedure.

4. The method according to claim 1, where receiving the audio data comprises receiving a streaming audio file.

5. The method according to claim 1, further comprising in response to de-activation of the camera application, sending an indication of the deactivation to the second device.

6. The method according to claim 5, where receiving the audio data and the marker is performed in response to sending the indication of the deactivation.

7. The method according to claim 1, where the audio data comprises a plurality of audio data feeds recorded by a plurality of microphones.

8. The method according to claim 1, where merging the image data and the audio data comprises determining a point in the audio data corresponding to the time the camera event occurred based at least in part on the marker and the communication delay.

9. A method comprising:
- determining a communication delay between a first device and a second device;
- in response to receiving, at the second device, an indication of an activation of a camera application on the first device, starting recording audio data using a plurality of microphones;
- in response to receiving an indication of a camera event, creating a marker corresponding to a time when the second device received the indication of the camera event, where the camera event comprises taking a photograph; and
- sending, to the first device from the second device, the audio data and the marker then cross-correlating audio data from the plurality of microphones and the audio data from the first device.

10. The method according to claim 9, where determining the communication delay comprises performing a loop-back procedure.

11. The method according to claim 9, further comprising in response to receiving an indication of a deactivation of a camera application on the first device, sending the audio data and the marker.

12. An apparatus, comprising at least one processor; and at least one memory including computer program code, the at least one memory and the computer program code configured to, with the at least one processor, cause the apparatus to perform at least the following:
- to determine a communication delay between a first device and a second device;
- in response to activation of a camera application on the first device, to send an indication of the activation to the second device;
- in response to a camera event, to send an indication of the camera event to the second device, where the camera event comprises taking a photograph;
- to receive, at the first device from the second device, audio data and a marker corresponding to a time when the second device received the indication of the camera event; and
- to merge image data and the audio data based at least in part on the marker and the communication delay while cross-correlating audio data from the first device with the audio data from the second device.

13. The apparatus according to claim 12, where, when determining the communication delay, the at least one memory and the computer program code are further configured to cause the apparatus to perform a loop-back procedure.

14. The apparatus according to claim 12, where the at least one memory and the computer program code are further configured to cause the apparatus, in response to de-activation of the camera application, to send an indication of the deactivation to the second device.

15. The apparatus according to claim 14, where receiving the audio data and the marker is performed in response to sending the indication of the deactivation.

16. The apparatus according to claim 12, where, when merging the image data and the audio data, the at least one memory and the computer program code are further configured to cause the apparatus to determine a point in the audio data corresponding to the time the camera event occurred based at least in part on the marker and the communication delay.

17. A non-transitory computer readable medium tangibly encoded with a computer program executable by a processor to perform actions comprising:
- determining a communication delay between a first device and a second device;
- in response to activation of a camera application on the first device, sending an indication of the activation to the second device;
- in response to a camera event, sending an indication of the camera event to the second device, where the camera event comprises taking a photograph;
- receiving, at the first device from the second device, audio data and a marker corresponding to a time when the second device received the indication of the camera event; and
- merging image data and the audio data based at least in part on the marker and the communication delay while cross-correlating audio data from the first device with the audio data from the second device.

18. The non-transitory computer readable medium according to claim 17, where determining the communication delay comprises performing a loop-back procedure.

19. The non-transitory computer readable medium according to claim 17, where the actions further comprise: in response to de-activation of the camera application, sending an indication of the deactivation to the second device, and where receiving the audio data and the marker is performed in response to sending the indication of the deactivation.

* * * * *